(12) United States Patent
Joffe et al.

(10) Patent No.: US 11,693,816 B2
(45) Date of Patent: Jul. 4, 2023

(54) FLEXIBLE DATA INGESTION

(71) Applicant: ActionIQ, Inc., New York, NY (US)

(72) Inventors: Nitay Joffe, New Rochelle, NY (US);
Allen Ajit George, Brooklyn, NY (US);
Casey Lewis Green, Austin, TX (US);
Mitesh Patel, Chicago, IL (US);
Panagiotis Mousoulis, Astoria, NY (US)

(73) Assignee: ActionIQ, Inc., New York, NY (US)

( * ) Notice: Subject to any disclaimer, the term of this patent is extended or adjusted under 35 U.S.C. 154(b) by 0 days.

(21) Appl. No.: 17/023,756

(22) Filed: Sep. 17, 2020

(65) Prior Publication Data

US 2022/0083501 A1 Mar. 17, 2022

(51) Int. Cl.
*G06F 16/11* (2019.01)
*G06F 16/13* (2019.01)
*G06F 16/23* (2019.01)
*G06F 16/2455* (2019.01)
*G06F 16/25* (2019.01)

(52) U.S. Cl.
CPC ............ *G06F 16/116* (2019.01); *G06F 16/13* (2019.01); *G06F 16/2393* (2019.01); *G06F 16/24568* (2019.01)

(58) Field of Classification Search
CPC ...... G06F 16/116; G06F 16/13; G06F 16/258; G06F 16/254
See application file for complete search history.

(56) References Cited

U.S. PATENT DOCUMENTS

| | | | | |
|---|---|---|---|---|
| 9,092,502 B1* | 7/2015 | Cannaliato | ............ | G06F 16/245 |
| 2005/0114405 A1* | 5/2005 | Lo | ............ | G06F 16/116 |
| 2006/0259456 A1* | 11/2006 | Falk | ............ | G06F 16/116 |
| 2009/0064160 A1* | 3/2009 | Larson | ............ | G06F 16/2393 718/104 |
| 2013/0185251 A1* | 7/2013 | Garg | ............ | G06F 16/86 707/602 |

(Continued)

OTHER PUBLICATIONS

Extended European Search Report issued in App. No. EP21197372.2, dated Feb. 9, 2022, 8 pages.

(Continued)

*Primary Examiner* — Dennis Truong
(74) *Attorney, Agent, or Firm* — Butzel Long

(57) ABSTRACT

Systems and techniques are provided for flexible data ingestion. Data including a file including a database table may be received at a computing device. The file may be in a non-standard binary format. The data including the file may be stored unaltered as a source data chunk. A processed data chunk may be generated from the source data chunk by converting the file to a standard binary format and storing the file in the processed data chunk without altering the source data chunk. A materialized data chunk may be generated from the processed data chunk by performing, with a database server engine of the computing device, a database operation on the database table of the file of the processed data chunk and storing the file in the materialized data chunk without altering the processed data chunk. The database table of the file of the materialized data chunk may be made available for querying by the database server engine.

20 Claims, 11 Drawing Sheets

(56) References Cited

U.S. PATENT DOCUMENTS

| | | | | |
|---|---|---|---|---|
| 2014/0279834 A1* | 9/2014 | Tsirogiannis | ......... | G06F 16/235 |
| | | | | 707/602 |
| 2014/0279838 A1* | 9/2014 | Tsirogiannis | ........... | G06F 16/22 |
| | | | | 707/603 |
| 2015/0095308 A1* | 4/2015 | Kornacker | ............ | G06F 16/258 |
| | | | | 707/718 |
| 2017/0124166 A1* | 5/2017 | Thomas | .................. | H04L 69/22 |
| 2017/0223003 A1* | 8/2017 | Miles | .................. | G06F 21/6254 |
| 2017/0371926 A1* | 12/2017 | Shiran | ............... | G06F 16/24542 |
| 2018/0165604 A1* | 6/2018 | Minkin | .................. | G06N 5/022 |
| 2019/0171650 A1* | 6/2019 | Botev | ................. | G06F 16/2379 |
| 2021/0165783 A1* | 6/2021 | Deshpande | ........ | G06F 16/24568 |

OTHER PUBLICATIONS

Rooney Sean et al: "Experiences with Managing Data Ingestion into a Corporate Datalake", 2019 IEEE 5th International Conference on Collaboration and Internet Computing (CIC), IEEE, Dec. 12, 2019 (Dec. 12, 2019), pp. 101-109, XP033716742, DOI: 10.1109/CIC48465. 2019.00021 [retrieved on Feb. 12, 2020].

Lin Qiao et al: "Gobblin: Unifying Data Ingestion for Hadoop", Proceedings of the VLDB Endowment; [ACM Digital Library], Assoc. of Computing Machinery, New York, NY, vol. 8, No. 12, Aug. 1, 2015 (Aug. 1, 2015) pp. 1764-1769, XP058072843, ISSN: 2150-8097, DOI: 10.14778/2824032.2824073.

* cited by examiner

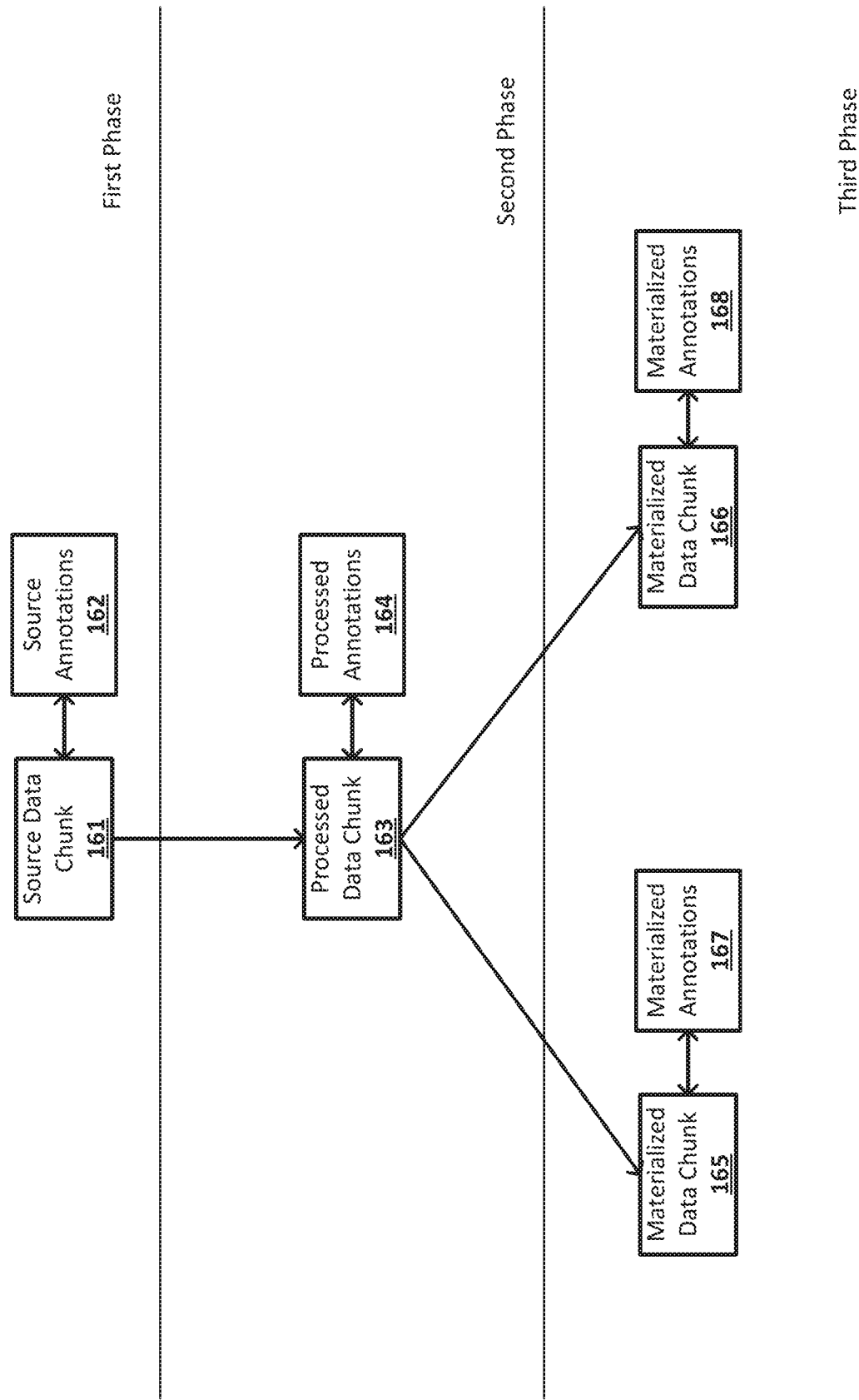

FLEXIBLE DATA INGESTION

BACKGROUND

Database tables from various sources may need to be ingested and made available to be queried. Querying a database that includes database tables ingested from various sources may result in runtime inefficiencies due to the database tables having different and non-standard binary formats and different schemas. The ingested database tables may be rewritten into a standard format, but this may sever the relationship between the ingested database table and the rewritten database table, causing inefficiencies in dealing with updates to the ingested database table.

BRIEF SUMMARY

According to implementations of the disclosed subject matter, data including a file including a database table may be received at a computing device. The file may be in a non-standard binary format. The data including the file may be stored unaltered as a source data chunk. A processed data chunk may be generated from the source data chunk by converting the file to a standard binary format and storing the file in the processed data chunk without altering the source data chunk. A materialized data chunk may be generated from the processed data chunk by performing, with a database server engine of the computing device, a database operation on the database table of the file of the processed data chunk and storing the file in the materialized data chunk without altering the processed data chunk. The database table of the file of the materialized data chunk may be made available for querying by the database server engine.

Systems and techniques disclosed herein may allow for flexible data ingestion. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4B shows an example visualization suitable for flexible data ingestion according to an implementation of the disclosed subject matter.

DETAILED DESCRIPTION

Figure 1:
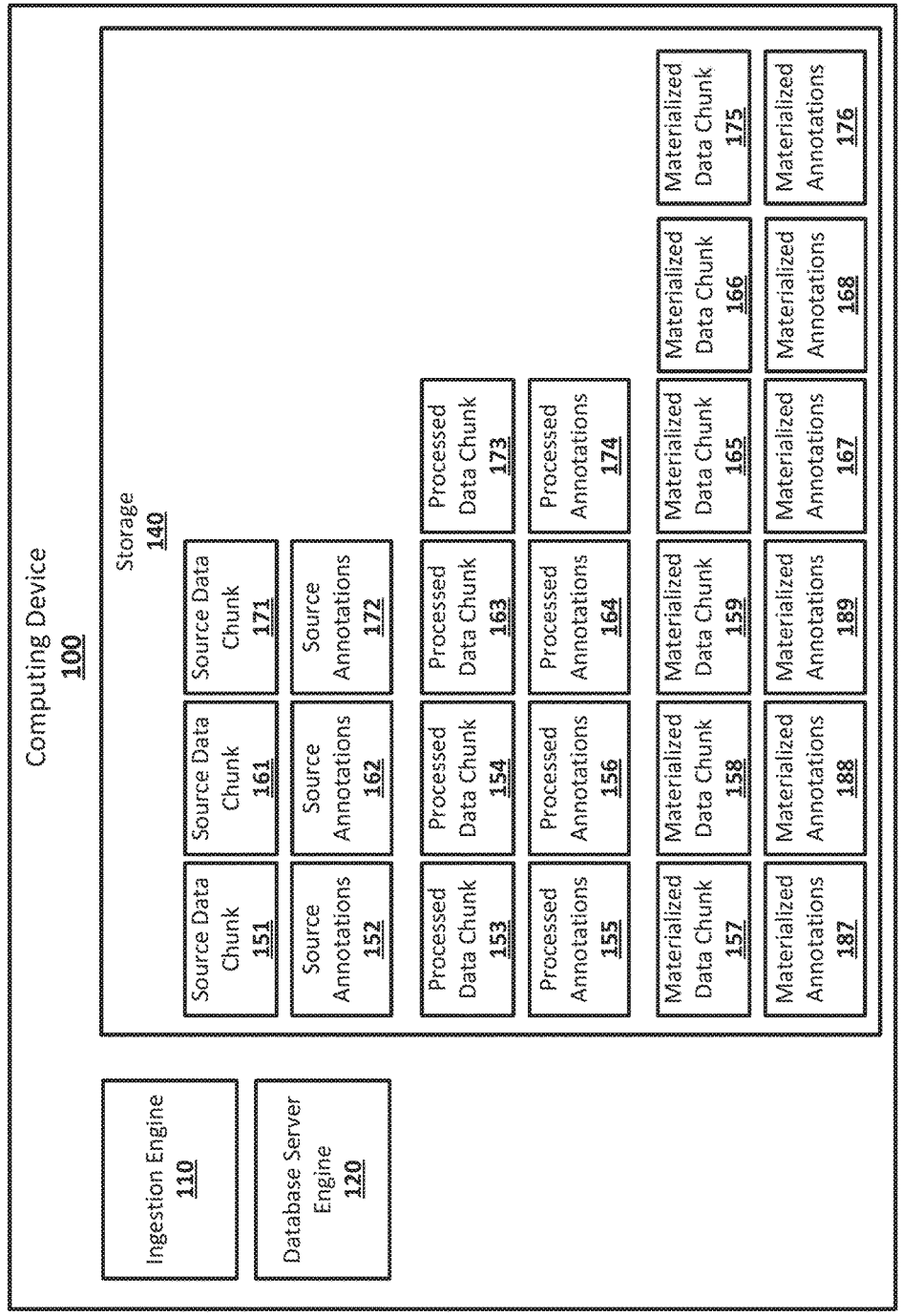
FIG. 1 shows an example system suitable for flexible data ingestion according to an implementation of the disclosed subject matter.

According to embodiments disclosed herein, flexible data ingestion may be used to ingest database tables from various sources while allowing flexibility in preparing the ingested database tables to be materialized for querying and in how updates to the ingested database tables are handled. Data that includes a database table may be received to be ingested. The data may be stored as a source data chunk. The source data chunk may be transformed into a processed data chunk that includes a file with a standard binary format. The processed data chunk may be transformed into a materialized data chunk that is prepared for querying. The source data chunk, processed data chunk, and materialized data chunk generated from the data may all be retained in storage, allowing for the generation of additional processed data chunks and materialized data chunks, and for updates to be made to the source data chunk based on additional received data. The source data chunk, processed data chunk, and materialized data chunk may each represent one of three phases for the received data in a pipeline for flexible data ingestion. Some operations performed on the received data may be performed while the received data is in different ones of the three phases. The phase in which an operation is performed may be chosen based on any suitable criteria.

Data that includes a database table may be received to be ingested. The data may be received at a database system that may include a database server engine for querying data. The database system may be implemented using any suitable number and type computing devices. The data may include data for a database table in a file that may be in a non-standard binary format, such as, for example, comma separated values (csv) format. The data may include additional files that may be metadata for the file that includes the database table. For example, an additional file may include a schema for the database table. The data may be received in any suitable manner from any suitable source of data. For example, the data may be received through a local or wide area network connection between a computing device or system that stores the data and the database system, or may be received on a suitable non-volatile storage medium that may be accessed by the database system. The data received at the database system may be a delta update that may be used to update previously ingested data, or may be a snapshot update that may replace previously ingested data.

The data may be stored as a source data chunk. To start ingesting the data, the data received at the database system may be stored unaltered as a source data chunk, including storing the file with the database table in the binary format in which it was received, even when that format is a non-standard binary format. For example, the data received at the database system may a database table stored in a csv-formatted file, and the database system may store the csv-formatted file in the source data chunk for the received data without changing or altering the csv-formatted file. The source data chunk stored based on received data may not be altered and may be kept for as long as data stored within the source data chunk is needed. The storing of the received data in an unaltered format in the source data chunk may allow for the data to be accessed by the database system at a later time without the data having been changed, even after the data has been used to generate processed data chunks and materialized data chunks. This may allow for the correction of any bugs or errors that may occur when generating the processed data chunks and materialized data chunks, as the unaltered data of the source data chunk may be used to re-generate processed data chunks which may in turn be used to regenerate materialized data chunks.

For example, the source data chunk may include a file named "foo.csv" which may include data for a database table as comma separate values. The data in foo.csv may be, for example:
Id, name,
1, bob,
2, sam,
3, alice Annotations for the source data chunk may be used in the generation of the source data chunk from the received data. Some data from the annotations may be stored as metadata for the source data chunk. The annotations for the source data chunk may include, for example, the name of the file stored in the source data chunk and the file path for the file stored in the source data chunk. For example, the annotations for the source data chunk that includes the file foo.csv may be:
name="foo"
filePath==s3://files_to_ingest/[23]

The source data chunk may be transformed into a processed data chunk that includes a file with a standard binary format. The source data chunk, which may store the data received at the database system, may include a file in a non-standard binary format, such as, for example, a csv file. The database system may generate a processed data chunk from the source data chunk by transforming the file in the source data chunk from a non-standard binary format into a standard binary format. The standard binary format may be, for example, XML, or parquet. The processed data chunk may include the data for a database table from the source data chunk stored as a file in a standard binary format. The file in the source data chunk may be left unaltered.

The processed data chunk may include a schema for the database table. The schema for the database table may be determined from the source data chunk in any suitable manner. For example, the file with the database table of the source data chunk may already explicitly state the schema of the data stored in the file, the schema may be stored in a separate file that may have been received as part of the received data stored in the source data chunk, or the schema may be implicit in the file. If the schema is implicit, the database system may automatically detect the schema from the data in the file of the source data chunk. For example, if the file is in csv format, the schema may be automatically detected from the first tuple in the file, which may include the column names for the database table stored in the file. In some instances, the source data chunk may include no schema. A human may review the data in the file of the source data chunk and determine the schema. The schema may be stored as annotations in metadata for the processed data chunk. The database system may use the schema specified in the annotations in metadata for the processed data chunk when transforming the source data chunk into a processed data chunk. The annotations may also include additional data for a schema that was either explicit or implicit in the file for the source data chunk. For example, annotations, which may be added by a human, may specify the data type of the data in the columns specified in the schema, for example, indicating which columns' data are strings and which are integers or any other suitable data types.

The data in the source data chunk may include garbage data. The database system may remove garbage data from the file in the source data chunk when transforming the source data chunk into the processed data chunk. The garbage data may remain stored in the source data chunk, but may not appear in the processed data chunk.

Verification may be performed when transforming a source data chunk into a processed data chunk. For example, if the received data was a delta update for database table already stored by the database system, the database system may check the schema of the database table in the received data to ensure that it matches the schema of the database table in processed data chunks already stored by the database system. The database system may, for example, compare the schema from the received data to the schema of the processed data chunk that was generated from the already stored to which the received data is a delta update.

Data validation may be performed when transforming a source data chunk into a processed data chunk. For example, the database system may validate that columns in the processed data chunk have the data type specified for them in the annotations for the source data chunk. If a column does not have the correct data type, for example, a column specified as having strings in the annotations for the source data chunk is not a string column in the database table of the processed data chunk, validation may fail, and the processed data chunk may not be stored for transformation into a materialized data chunk. The database system may also, for example, notify a user that validation has failed.

For example, the processed data chunk may include a file named "foo.parquet" which may include data for a database table in parquet format. The data stored in foo.parquet for the processed data chunk may be the data from foo.csv rewritten in parquet format and with a schema for a database table, for example:

```
struct foo{
  Id: int
  Name: string
}
Data = [
foo(1,"bob"),
```

```
    foo(2, "sam"),
    foo(3, "alice")
]
```

Annotations for the processed data chunk may be stored as metadata for the processed data chunk. The annotations for the processed data chunk may include, for example, the name of the file stored in the processed data chunk, the format of the file stored in the processed data chunk, and the schema for the database table in the file stored in the processed data chunk, or an indication that the database system should auto-detect the schema. For example, the annotations for foo.parquet may be:
name="foo"
outputFormat="parquet"
schema="auto-detect"

If the schema is explicitly stored in the annotations, the schema section may instead be:
schema=(int, string)

The processed data chunk may be transformed into a materialized data chunk that is prepared for querying. Transforming the processed data chunk to generate a materialized data chunk may include, for example, removing columns from the database table in the processed data chunk, adding columns to the database table in the processed data chunk, and appending processed data chunks that were generated from data that was a delta update to already stored database tables to processed data chunks for those already stored database tables. A column may be removed from the database table of the processed data chunk, for example, when the column is used to generate a new column that may be added to the processed data chunk. New columns may be added to the database table based on columns already in the database table of the processed data chunk. Computations using data from the database table of the processed data chunk that may normally be performed when the database table is queried may instead be performed when the processed data chunk is used to generate the materialized data chunk, with the results being stored in columns of the database table of the materialized data chunk. The database table of the materialized data chuck may be stored in a file with the same binary format as the file of the processed data chunk used to generate the materialized data chunk.

The database table of the materialized data chunk may include any new columns generated during the transformation of the materialized data chunk and may not include any columns removed during the generation of the materialized data chunk. The addition and removal of columns may be based on the specific purpose for which the database table of the processed data chunk is being materialized, and may be determined automatically by the database system, or may be specified by a user, for example, through instructions given to the database system at the time the materialized database chunk is generated or in any of the annotations.

For example, the materialized data chunk may include a file named "foo.parquet" which may include data for a database table in parquet format. The "foo.parquet" file in the materialized data chunk may include a new column generated from a column of the database table of the "foo.parquet" file of the processed data chunk. The new column may be, for example, a column that uppercases strings from an existing column of the database table. The data stored in foo.parquet for the materialized data chunk may be, for example:

```
struct foo{
    Id: int
    Name: string
    UppercaseName: string
}
Data = [
    foo(1,"bob", "BOB"),
    foo(2, "sam", "SAM"),
    foo(3, "alice", ALICE")
]
```

Annotations for the materialized data chunk may be stored as metadata for the materialized data chunk. The annotations for the materialized data chunk may include, for example, the name of the file stored as the materialized data chunk, the format of the file stored as the materialized data chunk, and any database table operations performed on the database table in the materialized data chunk during the transformation from the processed data chunk to the materialized data chunk and before the database table in the materialized data chunk is made available to be queried against. For example, the annotations for foo.parquet for the materialized data chunk may be:
name="foo"
outputFormat="parquet"
transformations=NewColumn(source=Name,
    target=UppercaseName, fun=(x→x.toUpper)

The materialized data chunk may be made available for querying. Queries received by a database server engine of the database system may be run against the database table in the materialized data chunk. The materialized data chunk may be made available for querying for any suitable period of time, such as, for example, until the database table of the materialized database chunk is out of date. For example, a new materialized data chunk may be generated based on a processed data chunk that was generated from a source data chunk that includes updated data for the database table of the materialized database chunk. The source data chunk may be a delta update, which may result in the appending of processed data chunks before the generation of the new materialized data chunk, or may be a snapshot update, which may result in the generation of a new processed data chunk that may be used to generate the new materialized data chunk.

The source data chunk, processed data chunk, and materialized data chunk generated from received data may all be retained in storage on the database system. This may allow for the generation of additional processed data chunks and materialized data chunks, and for updates to be made to the source data chunk based on additional received data. A single source data chunk may be used to generate multiple processed data chunks. The multiple processed data chunks may all be generated differently, for example, having different data removed as garbage and using different binary formats, different schemas, and different criteria for verification and validation. A single processed data chunk may be used to generate multiple materialized data chunks. The multiple materialized data chunks may differ, for example, having different columns added and removed. The different processed data chunks and materialized data chunks may be generated at any suitable times. For example, a processed data chunk may be generated from a source data chunk soon after a source data chunk is stored from received data, while another processed data chunk may be generated from the same source data chunk at a later time.

The source data chunk, processed data chunk, and materialized data chunk may each represent one of three phases for the received data in a pipeline for flexible data ingestion. In the first phase the received data may be in the form of the source data chunk generated through the storing of received data in an unaltered format. In the second phase the received data may be in the form of the processed data chunk generated through transformation of the source data chunk. In the third phase the received data may be in the form of the materialized data chunk generated through transformation of the processed data chunk.

Some operations performed on the received data may be performed while the received data is in different ones of the three phases. For example, casting a column of the database table of the received data to a specified data type my be performed when the received data is in the form of the source data chunk in the first phase and is being transformed to generate the processed data chunk, when the received data is in the form of the processed data chunk in the second phase is being transformed to generate the materialized data chunk, or when the received data is in the form of the materialized data chunk in the third phase, for example during runtime when the database table of the materialized data chunk is materialized and being queried. Creating new columns from existing columns and removing columns may also be performed at different phases.

The phase in which an operation is performed on the received data may be chosen based on any suitable criteria. For example, a casting on a column in the database table of received data may be performed in an earlier phase, allowing the operation to be performed more efficiently and preventing mistakes in later phases, or may be performed in later phases to allow for additional flexibility in how the data in the column being casted is treated in before the casting operation is performed. Casting a column to a specific data type may generally be performed during earlier phases, while creating new columns from existing columns of the database table may generally be performed during later phases. This may allow for further flexibility in the ingestion of data. Some operations may only be performed at runtime, such as operations that require data available only at runtime, for example, operations that perform calculations relative to the current date and time.

FIG. 1 shows an example system suitable for flexible data ingestion according to an implementation of the disclosed subject matter. A computing device 100 may include an ingestion engine 110, a database server engine 120, and storage 140. The computing device 100 may be any suitable device, such as, for example, a computer 20 as described in FIG. 6, for implementing the ingestion engine 110, the database server engine 120, and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The ingestion engine 110 may be any suitable combination of hardware and software for ingesting data received at the computing device 100 using a flexible data ingestion pipeline. The database server engine 120 may be any suitable combination of hardware and software for querying database tables that are in a format compatible with the database server engine 120. The storage 140 may be any suitable combination of hardware and software for implementing any suitable combination of volatile and non-volatile storage, which may store data chunks and associated annotations from different phases of the flexible data ingestion pipeline.

The ingestion engine 110 may be any suitable combination of hardware and software for ingesting data received at the computing device 100 using a flexible data ingestion pipeline. The ingestion engine 110 may receive data received at the computing device 100, and may ingest the data by processing the data through the phases of a flexible data ingestion pipeline, storing generated data chunks based on the received data. For example, the ingestion engine 110 may store received data in a source data chunk in a first phase, transform the source data chunk to generate a processed data chunk in a second phase, and transform the processed data chunk to generate a materialized data chunk that may then be made available to the database server engine 120 to be queried against in a third phase. The ingestion engine 110 may use, and store, annotations along with data chunks in the storage 140 at every phase of the flexible data ingestion pipeline. The data chunks generated by the ingestion engine 110 at every phase of the flexible data ingestion pipeline may remain stored in the storage 140 until, for example, they are purposefully deleted, for example, for being out-of-date.

The database server engine 120 may be any suitable combination of hardware and software for querying database tables that are in a format compatible with the database server engine 120. The database server engine 120 may, for example, be any available database server engine, such as a MySQL or Apache Spark™ database server engine. The database server engine 120 may query database tables from materialized data chunks in the storage 140 that are in a format that is compatible with the database server engine 120 and have been made available for querying by the ingestion engine 110. The database server engine 120 may, for example, run a query against a database table to return results, for example, to a user. The database server engine 120 may be used by the ingestion engine 110 when processing database tables in data chunks, for example, to generate new columns for database tables or remove columns from database tables.

The storage 140 may be any suitable storage hardware connected to the computing device 100. For example, the storage 140 may be a component of the computing device, such as a magnetic disk, flash memory module or solid state disk, or may be connected to the computing device 100 through any suitable wired or wireless connection. The storage 140 may be a local storage, i.e., within the environment within which the computing device 100 operates, or may be partially or entirely operated on a remote server. The storage 140 may store data chunks which include data for database tables at every phase of the flexible ingestion pipeline, such source data chunks 151, 161, and 171, processed data chunks 152, 153, 154, 163, and 173, materialized data chunks 157, 158, 159, 165, 166, and 175, and annotations for the data chunks, such as source annotations 152, 162, and 172, processed annotations 155, 156, 164, and 174, and materialized annotations 187, 188, 189, 167, 168, and 176.

The source data chunks 151, 161, and 171 may be data stored in the storage 140 by the ingestion engine 110 based on data received at the computing device 100 from any suitable source, including, for example, from other computing devices and systems and from other storage accessible to the computing device 100. The source data chunks 151, 161, and 171 may include data for database tables stored in files that are in a non-standard binary format, such as, for example, csv files. The processed data chunks 152, 153, 154, 163, and 173 may be data stored in the storage 140 by the ingestion engine 110 based on transforming source data chunks, such as the source data chunks 151, 161, and 171. The ingestion engine 110 may, for example, transform a source data chunk by generating a file in a standard binary format from a file in non-standard binary format from the source data chunk, including, for example, adding a schema to a database table in the file. The materialized data chunks 157, 158, 159, 165, 166, and 175 may be data stored in the storage 140 by the ingestion engine 110 based on transforming processed data chunks, such as the processed data chunks 152, 153, 154, 163, and 173. The ingestion engine 110 may, for example, transform a processed data chunk by generating a file from a file in the processed data chunk, including, for example, performing operations such as adding columns to and removing columns from the database table in the file.

The source annotations 152, 162, and 172 may be annotations made, respectively, to the source data chunks 151, 161, and 171. The source annotations 152, 162, and 172 may be generated in any suitable manner, including, for example, through human or automated review of the source data chunks 151, 161, and 171. The source annotations 152, 162, and 172 may include, for example, the file names and file paths of the files with database tables received at the computing device 100 and stored by the ingestion engine 110 in the respective source data chunks 151, 161, and 171. The source annotations 152, 162, and 172 may be stored as metadata for the source data chunks 151, 161, and 171 in any suitable manner.

The processed annotations 155, 156, 164, and 174, may be annotations made, respectively, to the processed data chunks 152, 153, 154, 163, and 173. The processed annotations 155, 156, 164, and 174 may have been generated in any suitable manner, including, for example, through human or automated review of the processed data chunks 152, 153, 154, 163, and 173. The processed annotations 155, 156, 164, and 174 may include, for example, the file names of the files with database tables received at the computing device 100 stored by the ingestion engine 110 in the respective processed data chunks 152, 153, 154, 163, and 173, the formats of the files, and the schemas of the database tables in the files. The processed annotations 155, 156, 164, and 174 may be stored as metadata for the processed data chunks 152, 153, 154, 163, and 173 in any suitable manner.

The materialized annotations 187, 188, 189, 167, 168, and 176 may be annotations made, respectively, to the materialized data chunks 157, 158, 159, 165, 166, and 175. The materialized annotations 187, 188, 189, 167, 168, and 176 may have been generated in any suitable manner, including, for example, through human or automated review of the materialized data chunks 157, 158, 159, 165, 166, and 175. The materialized annotations 187, 188, 189, 167, 168, and 176 may include, for example, the file names of the files with database tables stored by the ingestion engine 110 in the respective materialized data chunks 157, 158, 159, 165, 166, and 175, the formats of the files, and operations to be performed on the files before the database table are made available to be queried against. The materialized annotations 187, 188, 189, 167, 168, and 176 may be stored as metadata for the materialized data chunks 157, 158, 159, 165, 166, and 175 in any suitable manner.

Figure 2A:
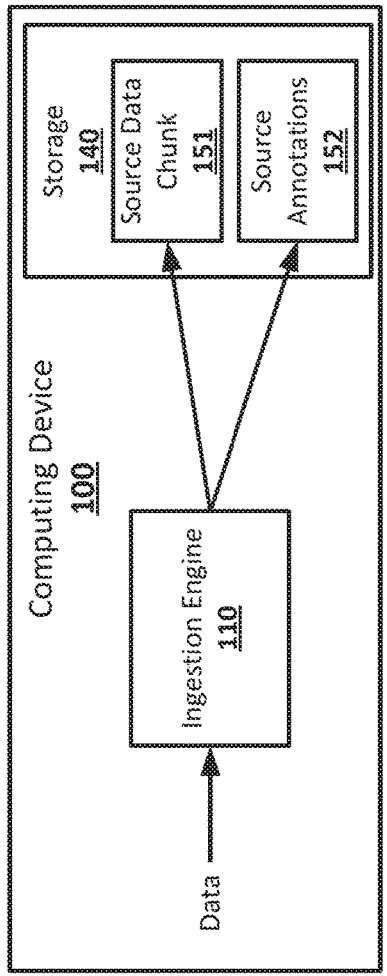
FIG. 2A shows an example arrangement suitable for flexible data ingestion according to an implementation of the disclosed subject matter.

FIG. 2A shows an example arrangement suitable for flexible data ingestion according to an implementation of the disclosed subject matter. Data may be received at the computing device 100. The data may be received from any suitable source, including another computing device or system, or a storage device accessible to the computing device 100. The data may include a database table in a file that is in a non-standard binary format, such as a csv file. The ingestion engine 110 may receive the data and may store the data as the source data chunk 151. The source data chunk 151 may include the data received at the computing device 100 in an unaltered format, for example, storing a csv file from the data without making any changes to the csv file. The source data chunk 151 may also include any additional data received at the computing device 100 along with the file that includes the database table. For example, the data may include a second file that may state the schema for the database table in the csv file. The ingestion engine 110 may store the second file as part of the source data chunk 151. The ingestion engine 110 may also store the source annotations 152, which may be annotations that are metadata for the source data chunk 151. The source annotations 152 may, for example, include the file name of the csv file in the source data chunk 151, and the file path for the file with the database table in the source data chunk 151.

Figure 2B:
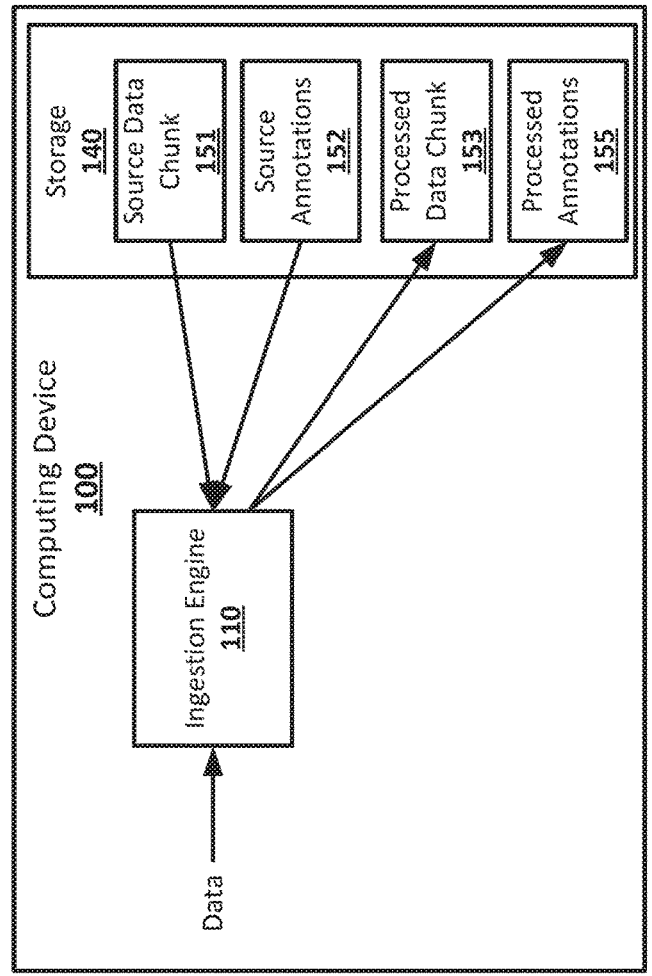
FIG. 2B shows an example arrangement suitable for flexible data ingestion according to an implementation of the disclosed subject matter.

FIG. 2B shows an example arrangement suitable for flexible data ingestion according to an implementation of the disclosed subject matter. The ingestion engine 110 may generate the processed data chunk 153 through transformation of the source data chunk 151. The ingestion engine 110 may, for example, transform the file in the source data chunk 151 from a non-standard binary format, such as csv, to a standard binary format, such as parquet or WL. The ingestion engine 110 may determine a schema for the database table in the file of the source data chunk 151. The ingestion engine 110 may determine the schema for the database table based on, for example, a schema that is already explicitly stated in the file, a schema that is stored in a separate file that may have been received as part of the data stored as the source data chunk, or a schema that is implicit in the file. If the schema is implicit, the ingestion engine 110 may automatically detect the schema from the file, such as when, for example, the file is in csv format and the schema may be automatically detected from the first tuple in the file. If the file in the source data chunk 151 does not include a schema, either explicitly or implicitly, a human may review the data in the file of the source data chunk 151 and determine the schema of the database table. The ingestion engine 110 may use the determined schema for the database table when transforming the source data chunk 151 to the processed data chunk 153, for example, writing the schema to the file of the processed data chunk 153 along with other data for the database table from the file of the source data chunk 151.

The ingestion engine 110 may remove garbage data from the file of the source data chunk 151 when writing the file for the processed data chunk 153. The garbage data may remain stored in the file of the source data chunk 151, but may not appear in the file of the processed data chunk 153. This may allow for a new processed data chunk to be generated from the source data chunk 151 if it is later determined that any of the data removed when writing the file for the processed data chunk 153 was not garbage and should have been included in the file for the processed data chunk 153.

The ingestion engine 110 may perform verification when transforming the source data chunk 151 into the processed data chunk 153. For example, if the data received at the computing device 100 and stored in the source data chunk 151 was a delta update for data already stored in the storage 140 of the computing 100, the ingestion engine 110 may check the schema of the of the received data to ensure that it matches the schema of the already stored data.

The ingestion engine 110 may perform data validation when transforming the source data chunk 151 into the processed data chunk 153. For example, the ingestion engine 110 may validate that columns in the database table of the processed data chunk 153 have the data type specified for them in the annotations for the source data chunk 151. If a column does not have the correct data type, for example, a column specified as having strings in the annotations for the source data chunk 151 is not a string column in the processed data chunk 153, validation may fail, and the processed data chunk 153 may not be stored for transformation into a materialized data chunk. The ingestion engine 110 may, for example, notify a user of the computing device 100 that validation of the source data chunk 151 failed.

The ingestion engine 110 may also store the processed annotations 155, which may be annotations that are metadata for the processed data chunk 153. The processed annotations 155 may, for example, include the file name of the file in the processed data chunk 153, the file format for the file in the processed data chunk 153, and the schema for the database table in the file in the processed data chunk 153. The processed annotations 155 may also include additional data for a schema that was either explicit or implicit in the file for the source data chunk. For example, the processed annotations 155 may specify the data type of the data in the columns specified in the schema, for example, indicating which columns data are strings and which are integers or any other suitable data types.

The ingestion engine 110 may not alter the source data chunk 151 when generating the processed data chunk 153. This may allow the source data chunk 151 to be used to generate additional processed data chunks from the same data that was received at the computing device 100 and used to generate the processed data chunk 153.

Figure 2C:
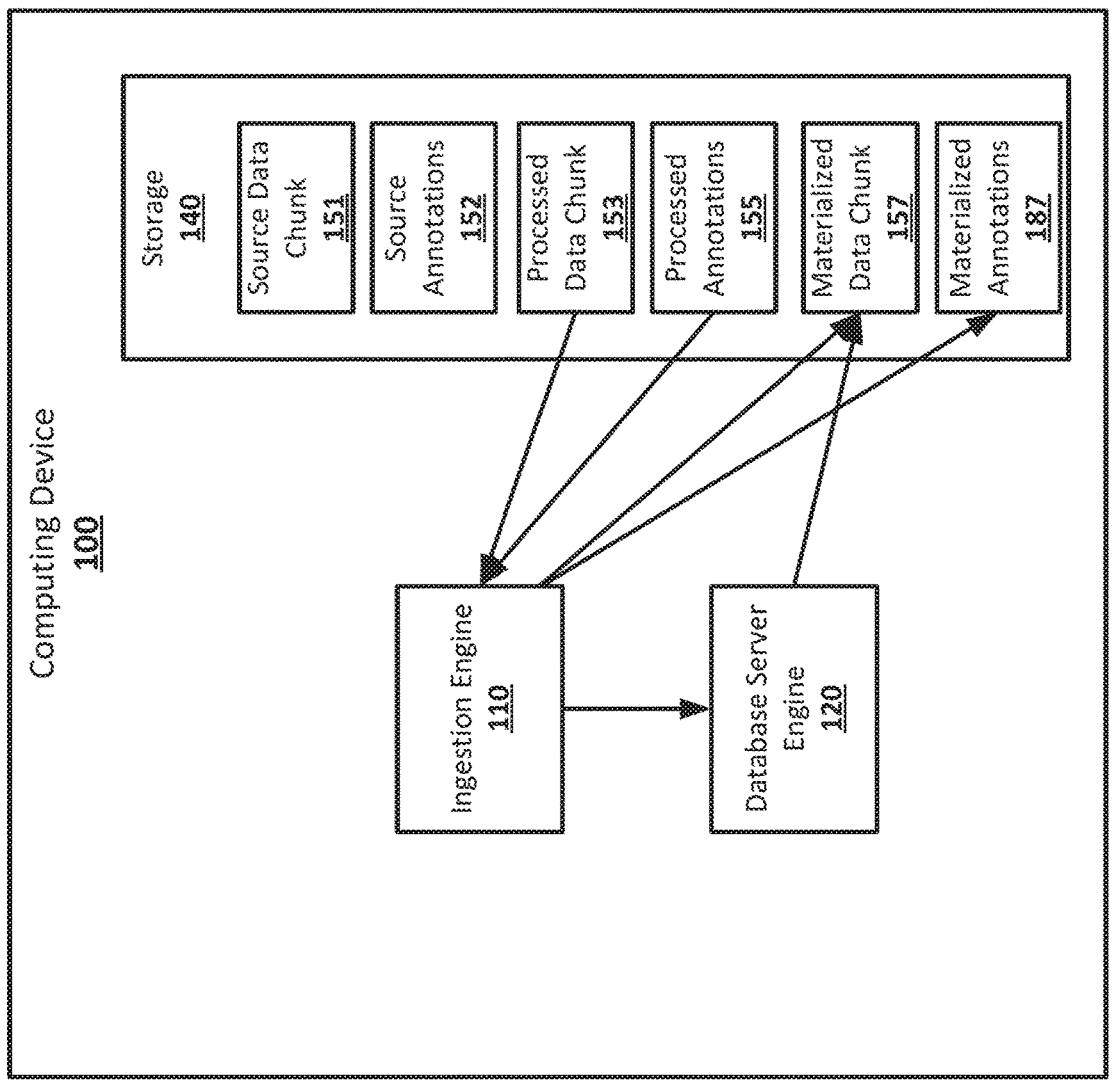
FIG. 2C shows an example arrangement suitable for flexible data ingestion according to an implementation of the disclosed subject matter.

FIG. 2C shows an example arrangement suitable for flexible data ingestion according to an implementation of the disclosed subject matter. The ingestion engine 110 may generate the materialized data chunk 157 through transformation of the processed data chunk 153. The ingestion engine 110 may, for example, transform the file in the processed data chunk 153 by adding columns to and removing columns from the database table in the file, and by appending the processed data chunk 153 and any other processed data chunks that were generated from data that was a delta update to already stored data to the processed data chunks for that already stored data. The ingestion engine 110 may add and remove columns by, for example, copying the file in the processed data chunk 153 to the materialized data chunk 157 and sending queries to the database server engine 120 to cause the database serve engine 120 to add and remove columns to and from the copied file in the materialized data chunk 157.

The ingestion engine 110 may also store the materialized annotations 187, which may be annotations that are metadata for the materialized data chunk 157. The materialized annotations 187 may, for example, include the name of the file stored in the materialized data chunk 157, the format of the file stored in the materialized data chunk 157, and any database operations performed on the database table in the processed data chunk 153 to transform it to the file in the materialized data chunk 157, such as additions and removals of columns, before the database table in the materialized data chunk 157 is made available to be queried against.

The materialized data chunk 157 may be made available for querying. For example, the ingestion engine 110 may make the database table in the file in the materialized data chunk 157 available to be queried after the materialized data chunk 157 is generated and stored in the storage 140. Queries received by the database server engine 120 may be run against the database table in the materialized data chunk 157.

The ingestion engine 110 may not alter the processed data chunk 155 when generating the materialized data chunk 157. This may allow the processed data chunk 155 to be used to generate additional materialized data chunks from the same data that was received at the computing device 100 and used to generate the materialized data chunk 157

Figure 3A:
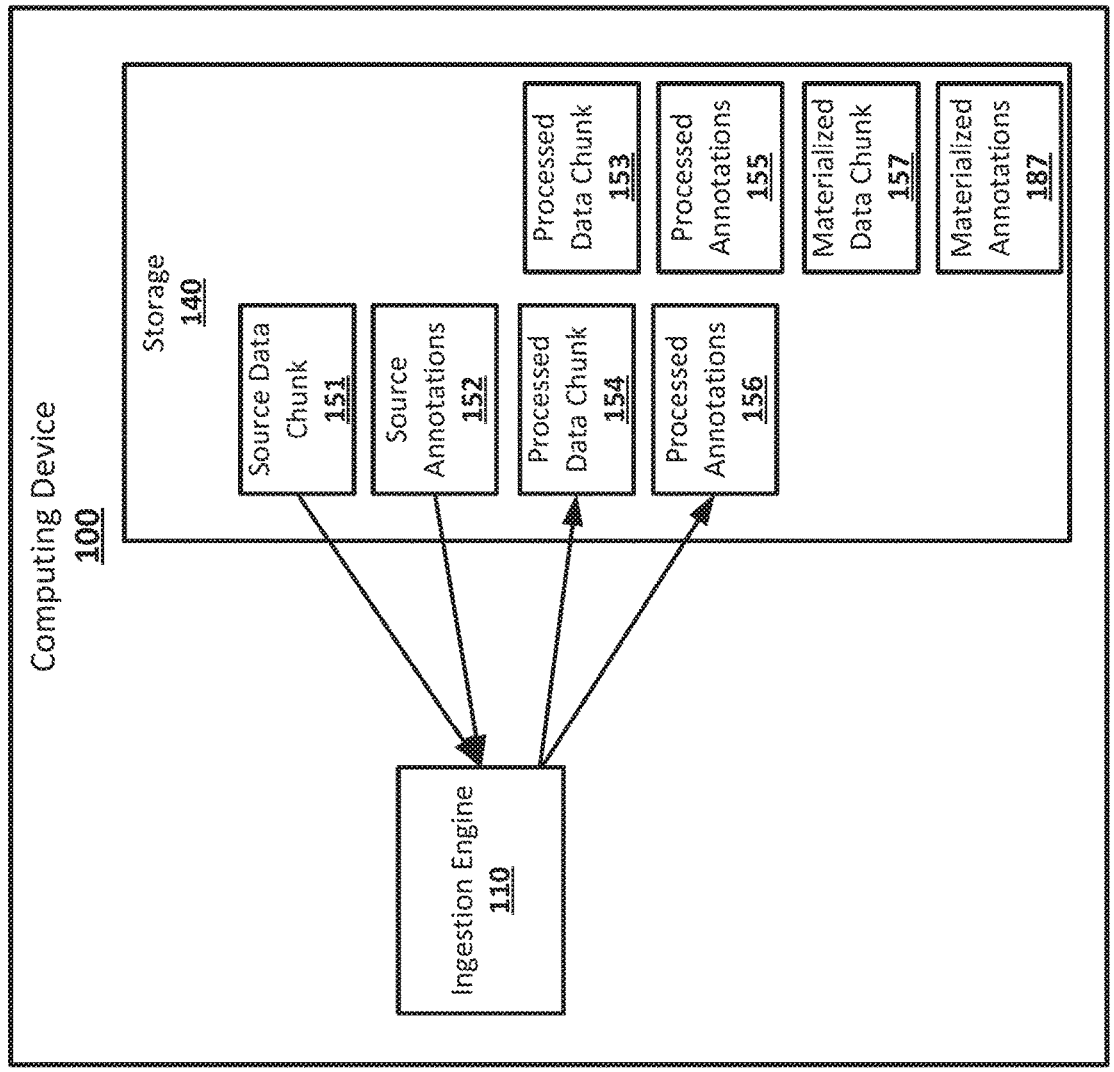
FIG. 3A shows an example arrangement suitable for flexible data ingestion according to an implementation of the disclosed subject matter.

FIG. 3A shows an example arrangement suitable for flexible data ingestion according to an implementation of the disclosed subject matter. The ingestion engine 110 may, after generating the processed data chunk 153 and the materialized data chunk 157, generate another processed data chunk from the source data chunk 151. For example, the ingestion engine 110 may generate the processed data chunk 154 from the source data chunk 151. The processed data chunk 154 may be stored in the storage 140 along with the processed data chunk 153, and may be different from the processed data chunk 153. The ingestion engine 110 may, for example, use a different standard binary file format when generating the processed data chunk 154 than was used to generate the processed data chunk 153, use a different schema for the database table in the processed data chunk 154 than was used in the processed data chunk 153, may cast the data types of columns differently, may change which data is removed as garbage, may change the nature of the data validation and verification performed on the data, or may make any other changes from the way the processed data chunk 153 was generated. This may allow the source data chunk 151 to be transformed into multiple different processed data chunks, each of which may be generated at any time after the source data chunk 151 is stored in the storage 140, and each of which may be different from the other processed data chunks while being based on the same database table from the file of the source data chunk 151. The ingestion engine 110 may also generate the processed annotations 156 as metadata for the processed data chunk 154. The processed annotations 156 may, for example, differ from the processed annotations 155. The differences between the processed annotations 156 and the processed annotations 155 may indicate the differences between the processed data chunk 154 and the processed data chunk 153.

Figure 3B:
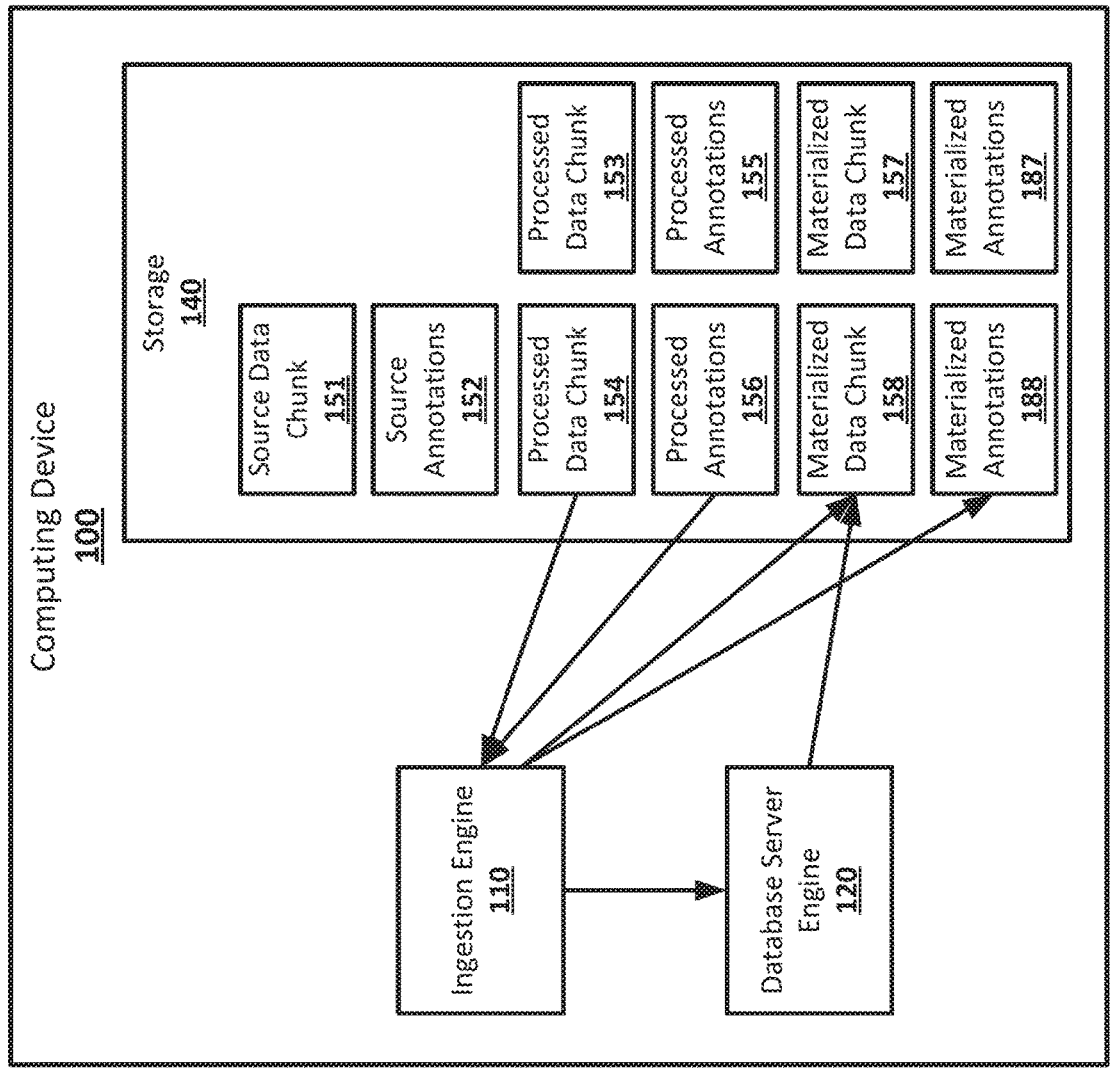
FIG. 3B shows an example arrangement suitable for flexible data ingestion according to an implementation of the disclosed subject matter.

FIG. 3B shows an example arrangement suitable for flexible data ingestion according to an implementation of the disclosed subject matter. The ingestion engine 110 may, after generating the processed data chunk 154, generate another materialized data chunk. For example, the ingestion engine 110 may generate the materialized data chunk 158 from the processed data chunk 154. The materialized data chunk 158 may be stored in the storage 140 along with the materialized data chunk 157, and may be different from the materialized data chunk 157. The differences between the materialized data chunk 157 and the materialized data chunk 158 may be based on, for example, differences between the processed data chunk 154 and the processed data chunk 153, which may have been generated by the ingestion engine 110 in different manners from the source data chunk 151, and differences in the way in which the ingestion engine 110 generates the materialized data chunk 158. The ingestion engine 110 may, for example, use a different standard binary file format when generating the materialized data chunk 158 than was used to generate the materialized data chunk 157 as the processed data chunk 154 may have been generating using a different standard binary file format than the processed data chunk 153, may add and remove different columns to and from the database table of the materialized data chunk 158 than were added to and removed from the database table of the materialized data chunk 157, or may make any other changes from the way the materialized data chunk 157 was generated. The ingestion engine 110 may, for example, send queries to the database server engine 110 to cause the database server engine 110 to add and remove columns from the database table of the materialized data chunk 158 during the generation of the materialized data chunk 158. This may allow for multiple different materialized data chunks to be generated starting with the source data chunk 151, each of which may be generated at any time after the source data chunk 151 is stored in the storage 140, and each of which may be different from the other materialized data chunks while still using the data from the source data chunk 151. The ingestion engine 110 may also generate the materialized annotations 188 as metadata for the materialized data chunk 158. The materialized annotations 188 may, for example, differ from the materialized annotations 187. The differences between the materialized annotations 188 and the materialized annotations 187 may indicate the differences between the materialized data chunk 158 and the materialized data chunk 157.

The database table of materialized data chunk 158 may be made available for querying by the database serve engine 120. The database table of the materialized data chunk 158 may be made available for querying concurrent with the availability of, in place of, or instead of, the database table of the materialized data chunk 187. This may allow for multiple database tables based on the source data chunk 151 to be made available for querying by the database server engine 120 at the same time or in place of or as alternatives to each other.

Figure 3C:
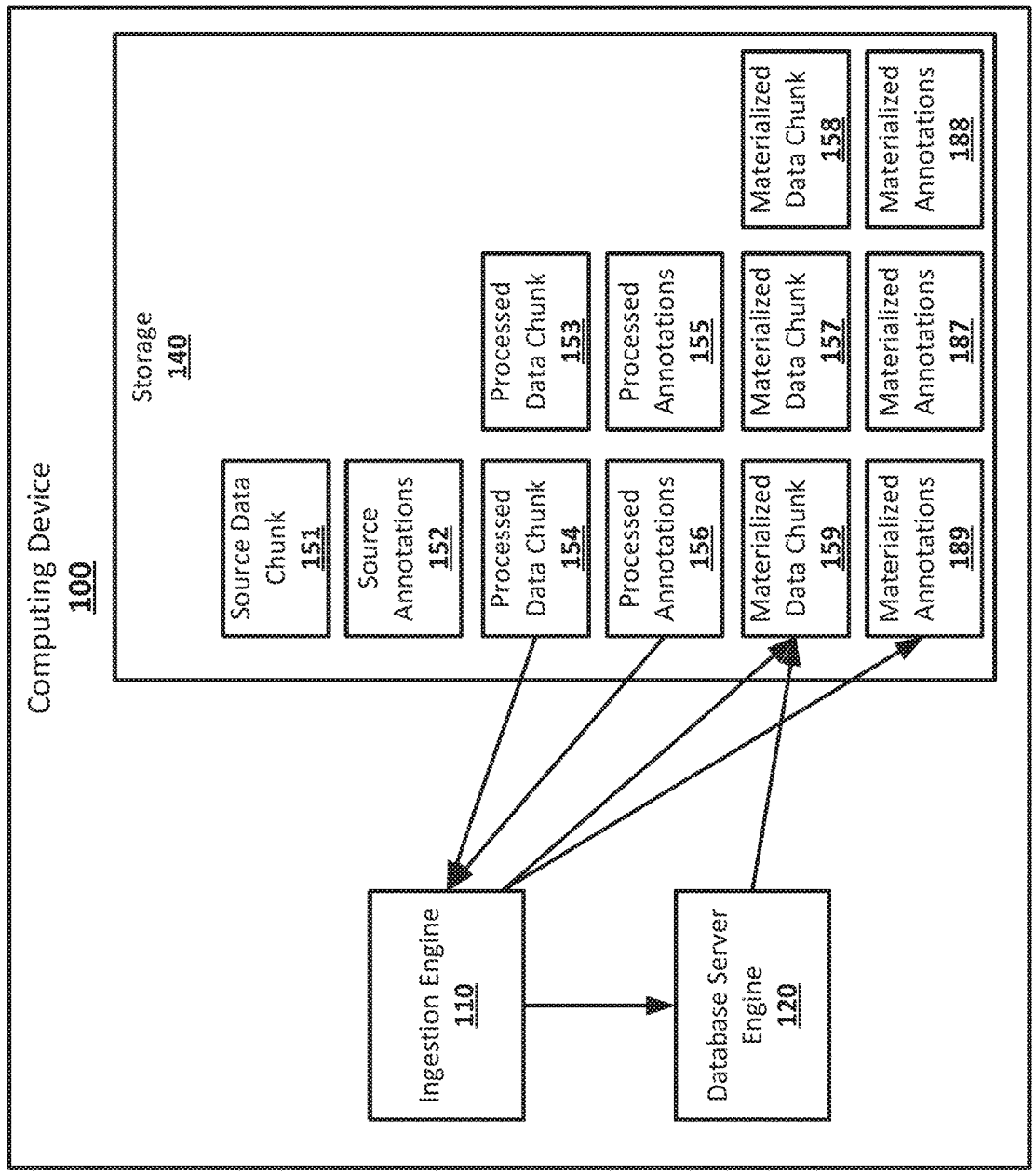
FIG. 3C shows an example arrangement suitable for flexible data ingestion according to an implementation of the disclosed subject matter.

FIG. 3C shows an example arrangement suitable for flexible data ingestion according to an implementation of the disclosed subject matter. The ingestion engine 110 may, after generating the processed data chunk 154 and the materialized data chunk 158, generate another materialized data chunk. For example, the ingestion engine 110 may generate the materialized data chunk 159 from the processed data chunk 154. The materialized data chunk 159 may be stored in the storage 140 along with the materialized data chunks 157 and 158, and may be different from the materialized data chunks 157 and 158. The differences between the materialized data chunk 157 and the materialized data chunk 159 may be based on, for example, differences between the processed data chunk 154 and the processed data chunk 153, which may have been generated by the ingestion engine 110 in different manners from the source data chunk 151. The differences between the materialized data chunk 158 and the materialized data chunk 159 may be based on, for example, the ingestion engine 110 adding and removing different columns to and from the database table of the materialized data chunk 159 than were added to and removed from the database table of the materialized data chunk 158, or making any other changes from the way the materialized data chunk 158. The ingestion engine 110 may, for example, send queries to the database server engine 110 to cause the database server engine 110 to add and remove columns to and from the database table of the materialized data chunk 159 during the generation of the materialized data chunk 159. This may allow for multiple different materialized data chunks to be generated starting with the source data chunk 151 and from the same processed data chunk, for example, the processed data chunk 154. Each of the materialized data chunks generated from the processed data chunk 154 may be generated at any time after the processed data chunk 154 is stored in the storage 140, and each of the materialized data chunks may be different from the other materialized data chunks while still using the data from the source data chunk 151 and being generated from the processed data chunk 154. The ingestion engine 110 may also generate the materialized annotations 189 as metadata for the materialized data chunk 159. The materialized annotations 189 may, for example, differ from the materialized annotations 187 and 188. The differences between the materialized annotations 189 and the materialized annotations 187 and 188 may indicate the differences between the materialized data chunk 159 and the materialized data chunks 157 and 158.

The database table of materialized data chunk 159 may be made available for querying by the database serve engine 120. The database table of the materialized data chunk 159 may be made available for querying concurrent with the availability of, in place of, or instead of, the database tables of the materialized data chunks 187 and 188.

Figure 4A:
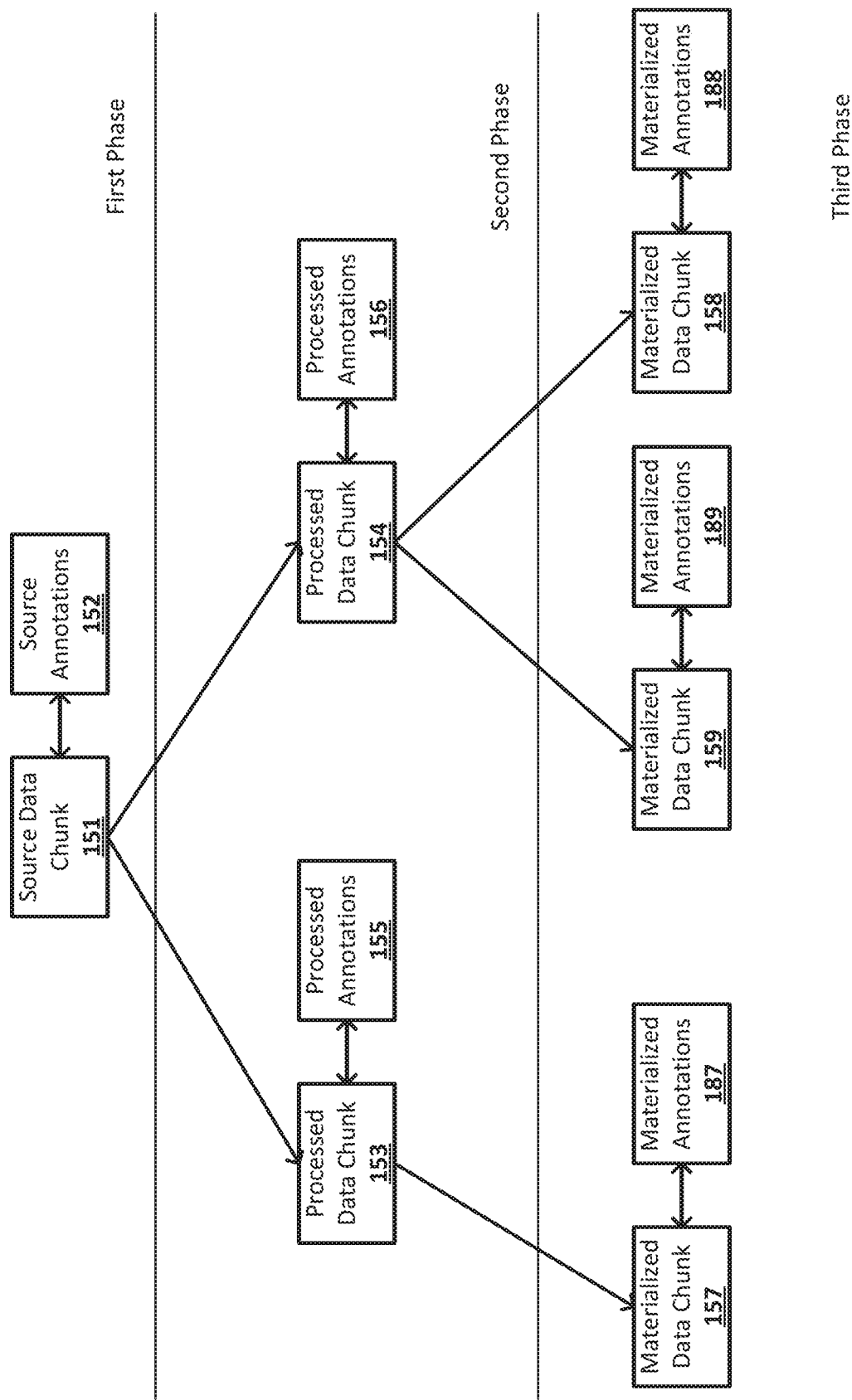
FIG. 4A shows an example visualization suitable for flexible data ingestion according to an implementation of the disclosed subject matter.

FIG. 4A shows an example visualization suitable for flexible data ingestion according to an implementation of the disclosed subject matter. In a first phase of a flexible data ingestion pipeline, data, including a file with data for a database table, received at the computing device 100, may be used by the ingestion engine 110 to generate the source data chunk 151. The source data chunk 151 may include the file from the data received at the computing device 100 stored unaltered. The source annotations 152 may be generated by the ingestion engine 110 and stored along with the source data chunk 151.

In a second phase of the flexible data ingestion pipeline, the source data chunk 151 may be used by the ingestion engine 110 to generate processed data chunks, such as the processed data chunks 153 and 154. The processed data chunks 153 and 154 may store files which are the result of converting the file of the source data chunk 151 into a standard binary format and performing any other suitable operations on the data in the file, including casting columns of the database table in the file, applying a schema to the database table in the file, removing garbage data, and performing data validation. The ingestion engine 110 may generate the processed data chunks 153 and 154 at any suitable time and in any order relative to each other. For example, both of the processed data chunks 153 and 154 may be generated before any materialized data chunk is generated from either of the processed data chunks 153 and 154, or the processed data chunk 154 may be generated sometime after the materialized data chunk 157 is generated from the processed data chunk 153. As the source data chunk 151 may remain in the storage 140 after the processed data chunk 153 has been generated, the ingestion engine 110 may be able to generate new processed data chunks from the source data chunk 151 at any time. The processed annotations 155 may be generated by the ingestion engine 110 and stored along with processed data chunk 153, and the processed annotations 156 may be generated by the ingestion engine 110 and stored along with the processed data chunk 154.

In the third phase of a flexible data ingestion pipeline, the processed data chunks 153 and 154 may be used by the ingestion engine 110 to generate materialized data chunks, such as the materialized data chunks 157, 158, and 159. The materialized data chunks 157, 158, and 159 may store files which are the result of processing the database tables in the files of the processed data chunk 153 or the processed data chunk 154 using any suitable database table operations, including, casting columns of the database tables, and adding and removing columns from the database table using the database server engine 120. The ingestion engine 110 may generate the materialized data chunks 157, 158 and 159 at any suitable time and in any order relative to each other. For example, the materialized data chunks 158 and 159 may be generated before or after the materialized data chunk 157, depending partly on whether the processed data chunk 154 is generated before the materialized data chunk 157. As the processed data chunks 153 and 154 may remain in the storage 140 after the materialized data chunks 157, 1578, and 159 have been generated, the ingestion engine 110 may be able to generate new materialized data chunks from the processed data chunks 153 and 154 at any time. The materialized annotations 187 may be generated by the ingestion engine 110 and stored along with materialized data chunk 157, the materialized annotations 188 may be generated by the ingestion engine 110 and stored along with materialized data chunk 158 and the materialized annotations 189 may be generated by the ingestion engine 110 and stored along with materialized data chunk 159.

FIG. 4B shows an example arrangement suitable for flexible data ingestion according to an implementation of the disclosed subject matter. In a first phase of a flexible data ingestion pipeline, data, including a file with data for a database table, received at the computing device 100, may be used by the ingestion engine 110 to generate the source data chunk 161. The source data chunk 161 may include the file from the data received at the computing device 100 stored unaltered. The data received at the computing device 100 and used to generate the source data chunk 161 may be different from the data used to generate the source data chunk 151, and may be, for example, data for a different database table than the database table of the file in the source data chunk 151. The source data chunk 161 may be generated by the ingestion engine 100 at any suitable time relative to the source data chunk 151 and any processed data chunks and materialized data chunks generated from the source data chunk 151. The source annotations 162 may be generated by the ingestion engine 110 and stored along with the source data chunk 161.

In the second phase of a flexible data ingestion pipeline, the source data chunk 162 may be used by the ingestion engine 110 to generate processed data chunks, such as the processed data chunk 163. The processed data chunk 163 may store a file which is the result of converting the file of the source data chunk 161 into a standard binary format and performing any other suitable operations on the data in the file, including casting columns of the database table in the file, applying a schema to the database table in the file, removing garbage data, and performing data validation. The ingestion engine 110 may generate the processed data chunk 163 at any suitable time. As the source data chunk 161 may remain in the storage 140 after the processed data chunk 163 has been generated, the ingestion engine 110 may be able to generate new processed data chunks from the source data chunk 161 at any time. The processed annotations 164 may be generated by the ingestion engine 110 and stored along with processed data chunk 163.

In the third phase of a flexible data ingestion pipeline, the processed data chunk 163 may be used by the ingestion engine 110 to generate materialized data chunks, such as the materialized data chunks 165 and 166. The materialized data chunks 165 and 166 may store files which are the result of processing the database tables in the files of the processed data chunk 163 using any suitable database table operations, including casting columns of the database tables and adding and removing columns from the database table using the database server engine 120. The ingestion engine 110 may generate the materialized data chunks 165 and 166 at any suitable time and in any order relative to each other. As the processed data chunk 163 may remain in the storage 140 after the materialized data chunks 165 and 166 have been generated, the ingestion engine 110 may be able to generate new materialized data chunks from the processed data chunk 163 at any time. The materialized annotations 167 may be generated by the ingestion engine 110 and stored along with materialized data chunk 165 and the materialized annotations 168 may be generated by the ingestion engine 110 and stored along with materialized data chunk 165.

Figure 4C:
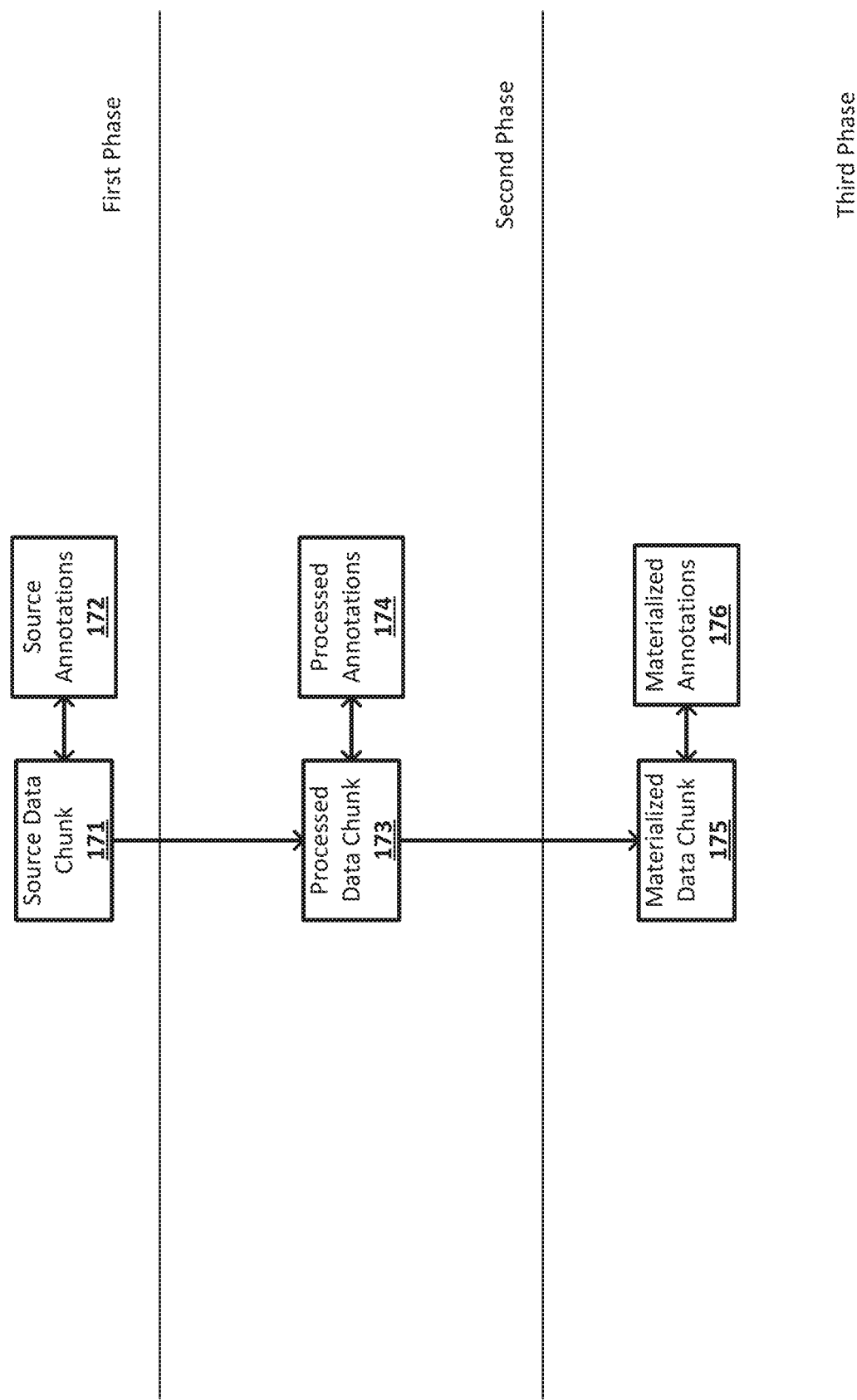
FIG. 4C shows an example visualization suitable for flexible data ingestion according to an implementation of the disclosed subject matter.

FIG. 4C shows an example arrangement suitable for flexible data ingestion according to an implementation of the disclosed subject matter. In a first phase of a flexible data ingestion pipeline, data, including a file with data for a database table, received at the computing device 100, may be used by the ingestion engine 110 to generate the source data chunk 171. The source data chunk 171 may include the file from the data received at the computing device 100 stored unaltered. The data received at the computing device 100 and used to generate the source data chunk 171 may be different from the data used to generate the source data chunk 151 and the data used to generate the source data chunk 161, and may be, for example, data for a different database table than the database tables of the files in the source data chunks 151 and 161. The source data chunk 171 may be generated by the ingestion engine 100 at any suitable time relative to the source data chunks 151 and 161 and any processed data chunks and materialized data chunks generated from the source data chunks 151 and 161. The source annotations 172 may be generated by the ingestion engine 110 and stored along with the source data chunk 171.

In the second phase of a flexible data ingestion pipeline, the source data chunk 172 may be used by the ingestion engine 110 to generate processed data chunks, such as the processed data chunk 173. The processed data chunk 173 may store a file which is the result of converting the file of the source data chunk 171 into a standard binary format and performing any other suitable operations on the data in the file, including casting columns of the database table in the file, applying a schema to the database table in the file, removing garbage data, and performing data validation. The ingestion engine 110 may generate the processed data chunk 173 at any suitable time. As the source data chunk 171 may remain in the storage 140 after the processed data chunk 173 has been generated, the ingestion engine 110 may be able to generate new processed data chunks from the source data chunk 171 at any time. The processed annotations 174 may be generated by the ingestion engine 110 and stored along with processed data chunk 173.

In the third phase of a flexible data ingestion pipeline, the processed data chunk 173 may be used by the ingestion engine 110 to generate materialized data chunks, such as the materialized data chunks 175. The materialized data chunk 175 may a store file which is the result of processing the database table in the file of the processed data chunk 173 using any suitable database table operations, including casting columns of the database tables and adding and removing columns to and from the database table using the database server engine 120. The ingestion engine 110 may generate the materialized data chunk 175 at any suitable time. As the processed data chunk 173 may remain in the storage 140 after the materialized data chunk 175 has been generated, the ingestion engine 110 may be able to generate new materialized data chunks from the processed data chunk 173 at any time. The materialized annotations 176 may be generated by the ingestion engine 110 and stored along with materialized data chunk 175.

Figure 5:
FIG. 5 shows an example procedure suitable for flexible data ingestion according to an implementation of the disclosed subject matter.

FIG. 5 shows an example procedure suitable for flexible data ingestion according to an implementation of the disclosed subject matter. At 500, data may be received. For example, the computing device 100 may receive data from any suitable source. The data received by the computing device 100 may include a file that includes data for a database table. The file may be in a non-standard binary format, such as, for example, csv format. The data may include additional files that provide metadata for the file with the database table. For example, the data may include a file that describes the schema of the database table.

At 502, the data may be stored unaltered as a source data chunk. For example, the ingestion engine 110, as part of the first phase of a flexible ingestion pipeline, may store the data received at the computing device 100 in the storage 140 unaltered as a source data chunk, such as the source data chunk 151. Any files in the received data may be stored in the source data chunk 151 in the formats in which they were received, without alterations. The ingestion engine 110 may also generate and store the source annotations 152 with the source data chunk 151.

At 504, a processed data chunk may be generated from the source data chunk. For example, the ingestion engine 110, as part of the second phase of the flexible ingestion pipeline, may transform the source data chunk 151 to generate the processed data chunk 153 which may then be stored in the storage 140 alongside the source data chunk 151, which may not be altered. The ingestion 110 may, for example, convert the file in the source data chunk 151 from a non-standard binary format, such as csv, to a standard binary format, such as parquet or XML, determine and apply a schema to the database table in the file, cast columns in the file to specific data types, remove garbage data from the file, and perform validation and verification on the database table. The ingestion engine 110 may also generate and store the processed annotations 155 with the processed data chunk 153.

At 506, whether a materialized data chunk is to be generated may be determined. If a materialized data chunk is to be generated, flow may proceed to 510, where a materialized data chunk may be generated, otherwise flow may proceed to 508 where it may be determined whether another processed data chunk will be generated from a source data chunk. The flexible ingestion pipeline may allow for materialized data chunks to be generated from processed data chunks at any time after the processed data chunk is generated, including immediately after, or any other suitable amount of time after. For example, after the processed data chunk 153 is generated and stored in the storage 140, the ingestion engine 110 may generate a materialized data chunk from the processed data chunk 153, or may generate another processed data chunk from the source data chunk 151.

At 508, whether a processed data chunk is to be generated may be determined. If a processed data chunk is to be generated, flow may proceed back to 504, where a processed data chunk may be generated from the source data chunk, otherwise flow may proceed to 506 where it may be determined whether a materialized data chunk will be generated from a processed data chunk. The flexible ingestion pipeline may allow for processed data chunks to be generated from source data chunks at any time after the source data chunk is generated, including, for example, after another processed data chunk has been generated and before that processed data chunk has been used to generate a materialize data chunk. For example, after the processed data chunk 153 is generated and stored in the storage 140, the ingestion engine 110 may generate another processed data chunk from the source data chunk 151 either before or after generating any materialized data chunks from the processed data chunk 153.

At 510, a materialized data chunk may be generated from a processed data chunk. The materialized data chunk may be generated from any processed data chunk that has been generated and stored in the storage 140. For example, the ingestion engine 110, as part of the third phase of the flexible ingestion pipeline, may transform the processed data chunk 153 to generate the materialized data chunk 157 which may then be stored in the storage 140 alongside the source data chunk 151 and the processed data chunk 153, neither of which may be altered during the generation of the materialized data chunk 157. The ingestion 110 may, for example, cast columns, add columns to, and remove columns from the database table of the processed data chunk 153 using queries submitted to the database server engine 120. The ingestion engine 110 may also generate and store the materialized annotations 187 with the materialized data chunk 187.

At 512, the materialized data chunk may be made available for querying. For example, the database table in the materialized database chunk 157 may be made available for the database server engine 120 to run queries against. Making the materialized database chunk 157 available for querying may require operations to be performed on the database table of the database chunk 157 at run-time, such as, for example, any computations that rely on the current date and time, along with the addition, removal, and casting of columns that were not performed during the third phase when the materialized data chunk 157 was generated. The flexible data ingestion pipeline may allow the option of performing some database table operations at different phases of the pipeline. For example, casting a column to a specific data type may be performed during the second phase, during the third phase, or at run-time after the third phase.

After a materialized data chunk is made available for querying, flow may proceed back to 506, where another materialized data chunk may be optionally generated, and to 508, where another processed data chunk may optionally be generated. The flexible data ingestion pipeline may allow for flexible ordering of the generation of processed data chunks and materialized data chunks.

Figure 6:
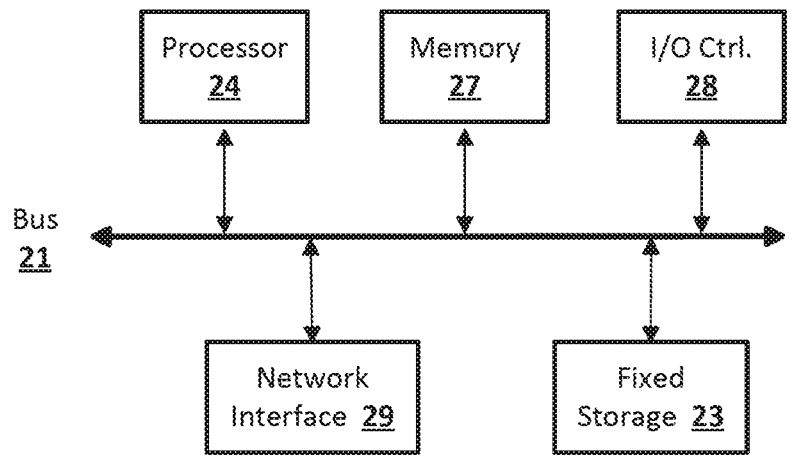
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input- Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
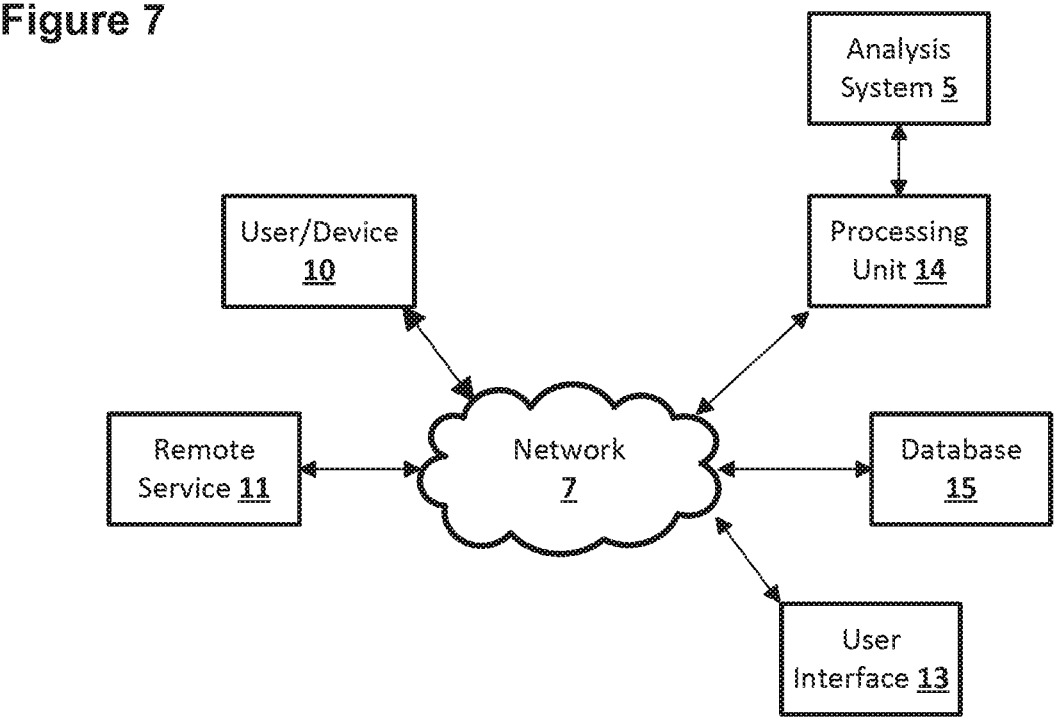
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database table 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database table 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database table 15 and/or user interface 13. In some arrangements, an analysis system 5 may provide back-end processing, such as where stored or acquired data is pre-processed by the analysis system 5 before delivery to the processing unit 14, database table 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, at a computing device, data comprising a file comprising a database table, wherein the file is in a non-standard binary format and comprises a delta update to previously received data comprising a second file;
   storing the data comprising the file unaltered as a source data chunk;
   generating, by an ingestion engine of the computing device, a processed data chunk from the source data chunk by converting the file to a standard binary format and storing the file in the processed data chunk without altering the source data chunk;
   generating, by the ingestion engine of the computing device, a materialized data chunk from the processed data chunk by appending the processed data chunk to a second processed data chunk and performing, with a database server engine of the computing device, at least one database operation on a database table of a file of the processed data chunk and the second processed data chunk and storing the file in the materialized data chunk without altering either the processed data chunk or the second processed data chunk, wherein the second processed data chunk was generated from a second source data chunk that comprises the previously received data and wherein the database table of the file of the processed data chunk and the second processed data chunk comprises the database table of the processed data chunk appended to a database table of the second processed data chunk; and
   making the database table of the file of the materialized data chunk available for querying by the database server engine.

2. The method of claim 1, further comprising:
   generating one or more additional processed data chunks from the source data chunk, wherein one or more additional processed data chunks are stored alongside the processed data chunk; and
   generating one or more additional materialized data chunk from any of the processed data chunk and the one or more processed data chunks, wherein the one more additional materialized data chunks are stored alongside the materialized data chunk.

3. The method of claim 1, further comprising:
   generating annotations for the source data chunk, wherein the annotations comprise a file name of the file of the source data chunk and a file path of the file of the source data chunk;
   generating annotations for the processed data chunk, wherein the annotations comprise a schema of the database table of the file of the processed data chunk; and
   generating annotations for the materialized data chunk, wherein the annotations comprise one or more database operations performed on the database table of the file of the processed data chunk during generation of the materialized data chunk.

4. The method of claim 1, wherein generating, by an ingestion engine of the computing device, a processed data chunk from the source data chunk further comprises performing at least one of: determining a schema of the database table of the file of the source data chunk, validating data, removing garbage data, and casting of columns of the database table of the file of the source data chunk.

5. The method of claim 1, wherein the at least one database operation performed on the database table of the file of the processed data chunk comprises one or both of adding a column to the database table of the file of the processed data chunk and removing a column from the database table of the file of the processed data chunk.

6. The method of claim 1, wherein generating, by the ingestion engine of the computing device, a materialized data chunk from the processed data chunk further comprises sending, by the ingestion engine to the database server engine, a query that causes the database server engine to perform the at least one database operation.

7. The method of claim 1, wherein at least one operation is optionally performed when generating the processed data chunk, when generating the materialized data chunk, or when the database of the file of the materialized data chunk is made available for querying.

8. The method of claim 1, wherein the data comprising the file comprising the database table comprises a delta update or a snapshot update for a previously stored source data chunk.

9. The method of claim 1, wherein the non-standard binary format is comma separated values (csv) and wherein the standard binary format is one of parquet and XML.

10. A computer-implemented system comprising:
a storage, and
a processor that receives data comprising a file comprising a database table, wherein the file is in a non-standard binary format and comprises a delta update to previously received data comprising a second file,
stores the data comprising the file unaltered as a source data chunk in the storage;
generates a processed data chunk from the source data chunk by converting the file to a standard binary format and storing the file in the processed data chunk without altering the source data chunk,
generates a materialized data chunk from the processed data chunk by appending the processed data chunk to a second processed data chunk and performing, with a database server engine, at least one database operation on a database table of a file of the processed data chunk and the second processed data chunk and storing the file in the materialized data chunk without altering either the processed data chunk or the second processed data chunk, wherein the second processed data chunk was generated from a second source data chunk that comprises the previously received data and wherein the database table of the file of the processed data chunk and the second processed data chunk comprises the database table of the processed data chunk appended to a database table of the second processed data chunk; and
makes the database table of the file of the materialized data chunk available for querying by the database server engine.

11. The system of claim 10, wherein the processor further:
generates one or more additional processed data chunks from the source data chunk, wherein one or more additional processed data chunks are stored alongside the processed data chunk in the storage, and
generates one or more additional materialized data chunk from any of the processed data chunk and the one or more processed data chunks, wherein the one more additional materialized data chunks are stored alongside the materialized data chunk in the storage.

12. The system of claim 10, wherein the processor further:
generates annotations for the source data chunk, wherein the annotations comprise a file name of the file of the source data chunk and a file path of the file of the source data chunk,
generates annotations for the processed data chunk, wherein the annotations comprise a schema of the database table of the file of the processed data chunk, and
generates annotations for the materialized data chunk, wherein the annotations comprise one or more database operations performed on the database table of the file of the processed data chunk during generation of the materialized data chunk.

13. The system of claim 10, wherein generating, by an ingestion engine of the computing device, a processed data chunk from the source data chunk further comprises performing at least one of: determining a schema of the database table of the file of the source data chunk, validating data, removing garbage data, and casting of columns of the database table of the file of the source data chunk.

14. The system of claim 10, wherein the at least one database operation performed on the database table of the file of the processed data chunk comprises one or both of adding a column to the database table of the file of the processed data chunk and removing a column from the database table of the file of the processed data chunk.

15. The system of claim 10, wherein the processor generates a materialized data chunk from the processed data chunk further by sending to the database server engine a query that causes the database server engine to perform the at least one database operation.

16. The system of claim 15, wherein at least one operation is optionally performed by the processor when the processor generates the processed data chunk, generates the materialized data chunk, or makes the database of the file of the materialized data chunk available for querying.

17. The system of claim 10, wherein the data comprising the file comprising the database table comprises a delta update or a snapshot update for a previously stored source data chunk.

18. The system of claim 10, wherein the non-standard binary format is comma separated values (csv) and wherein the standard binary format is one of parquet and XML.

19. A system comprising: one or more computers and one or more storage devices storing instructions which are operable, when executed by the one or more computers, to cause the one or more computers to perform operations comprising:
comprising:
receiving, at a computing device, data comprising a file comprising a database table, wherein the file is in a non-standard binary format and comprises a delta update to previously received data comprising a second file;
storing the data comprising the file unaltered as a source data chunk;

generating, by an ingestion engine of the computing device, a processed data chunk from the source data chunk by converting the file to a standard binary format and storing the file in the processed data chunk without altering the source data chunk;

generating, by the ingestion engine of the computing device, a materialized data chunk from the processed data chunk by appending the processed data chunk to a second processed data chunk and performing, with a database server engine of the computing device, at least one database operation on a database table of a file of the processed data chunk and the second processed data chunk and storing the file in the materialized data chunk without altering either the processed data chunk or the second processed data chunk, wherein the second processed data chunk was generated from a second source data chunk that comprises the previously received data and wherein the database table of the file of the processed data chunk and the second processed data chunk comprises the database table of the processed data chunk appended to a database table of the second processed data chunk; and making the database table of the file of the materialized data chunk available for querying by the database server engine.

20. The system of claim 19, wherein the instructions which are operable, when executed by the one or more computers, to cause the one or more computers to perform operations further comprises instructions which are operable, when executed by the one or more computers, to cause the one or more computers to perform operations comprising:

generating one or more additional processed data chunks from the source data chunk, wherein one or more additional processed data chunks are stored alongside the processed data chunk; and generating one or more additional materialized data chunk from any of the processed data chunk and the one or more processed data chunks, wherein the one more additional materialized data chunks are stored alongside the materialized data chunk.

* * * * *